United States Patent Office 2,956,969
Patented Oct. 18, 1960

2,956,969

COMPOSITION FOR MAKING ODORLESS, NON-EXUDING VINYLIDENE CHLORIDE COPOLYMER FILM

Carl B. Havens, Hope, Mich., assignor to The Dow Chemical Company, Midland, Mich., a corporation of Delaware No Drawing. Filed July 22, 1957, Ser. No. 673,103

4 Claims. (Cl. 260—23)

This application is a continuation-in-part of copending application Serial No. 446,403, filed July 28, 1954, now abandoned.

This invention relates to a composition of matter suitable for making odorless and non-exuding, stable films of copolymers of 5 to 30 percent vinyl chloride and 95 to 70 percent vinylidene chloride.

Films of the identified vinylidene chloride-vinyl chloride copolymers are now used extensively as protective wrappers for food products. For such purpose, the film must be odorless and must not exude the plasticizers or stabilizers which may be present in the composition. In addition, any such agents in the composition must be non-toxic. Actually, there is little need for plasticizers and stabilizers in the oriented, crystalline vinylidene chloride-vinyl chloride copolymer films after they have been made, but it is economically impractical to extract from such films the modifying agents which were originally mixed with the copolymer to make it extrudable.

The defined copolymers cannot be extruded without a plasticizer to reduce their melt viscosities. They become unstable on prolonged exposure to heat, and it is necessary to incorporate heat stabilizers in the compositions to be extruded. Other agents must be present to prevent discoloration of the finished film due to exposure to light. Many plasticizers and stabilizers, even when used at the minimum concentration necessary to permit satisfactory extrusion, are so incompatible with the oriented extruded product that they exude therefrom. Others, which can be used in small enough quantities to avoid exudation, have very pronounced odors. Some of the most effective heat stabilizers for the copolymer cannot be handled safely by some extruder operators because they tend to cause skin irritation, and these agents are deemed to be undesirable in food wrappers even though they may exhibit no evidence of oral toxicity.

For the foregoing and related reasons, it is desired to provide compositions suitable for making odorless, non-toxic, non-exuding films from copolymers of 95–70 percent vinylidene chloride and 5–30 percent vinyl chloride. Such is the principal object of this invention.

The composition, whereby the foregoing object is attained consists essentially of a copolymer of the stated analysis and from 3.5 to 8 percent in the aggregate, based on the weight of copolymer, of a mixture of: (a) from 2 to 5.5 percent of a compatible, at least partially aromatic, ester plasticizer, (b) from 1 to 2.5 percent of an aromatic ester of salicylic acid as a light stabilizer, and (c) from 0.5 to 1.5 percent of a heat stabilizer consisting essentially of an epoxidized vegetable oil which is a neutral glyceride, free form hydroxyl groups, containing an average of 3 to 5 oxirane rings per molecule, having a molecular weight from about 900 to 1200, and yielding on alkaline hydrolysis hydroxy fatty acids having average neutralization equivalents in the range from about 300 to about 380.

The plasticizer must not be wholly aliphatic if bleeding is to be avoided in any crystalline vinylidene chloride-vinyl chloride copolymer composition containing enough plasticizer to extrude easily. Suitable plasticizers include the alkyl phthalyl alkyl glycolates, wherein the alkyl groups have 1 to 4 carbon atoms, the mono-alkyl diaryl phosphates, wherein the alkyl groups have from 4 to 12 carbon atoms, and the butyl to octyl phthalates, all of which are at least partially aromatic in structure. In the present composition, extrusion is unsatisfactory with less than 2 percent plasticizer, and bleeding occurs with over 5.5 percent when effective amounts of the other agents are present. Examples of suitable plasticizers include methyl phthalyl ethyl glycolate, ethyl phthalyl ethyl glycolate, butyl phthalyl butyl glycolate, butyl diphenyl phosphate, hexyl dicresyl phosphate, octyl di-tertiarybutylphenyl phosphate, decyl di-orthochlorophenyl phosphate, dodecyl di-phenyl phosphate, dibutyl phthalate, diamyl phthalate, dihexyl phthalate, di-2-ethylhexyl phthalate, and di-n-octyl phthalate.

The salicylic acid aryl ester, used as a light stabilizer, may be salol, tertiary butyl salol, other alkyl phenyl salicylates, or it may be a disalicylic ester of a dihydric phenol such as hydroquinone or methylene or isopropylidene bisphenol. In all such esters it is seen that the non-salicylic esterifying group is aromatic. Less than 1 percent of such salicylate does not give the desired protection, and amounts over 2.5 percent tend to bleed from the film when effective amounts of the other agents are present. The word salol refers to phenyl salicylate.

The heat stabilizer described above is an odorless, tasteless, non-volatile glyceride which is compatible in the composition, is effectvie in a narrow range of concentrations and shows no tendency to exude from the finished films at those concentrations.

The aggregate amount of the plasticizer-stabilizer combination must be at least 3.5 percent if extrusion is to be effected readily but must not exceed 8 percent if exudation is to be avoided from the oriented film. Extrudability and freedom from odor are characteristics which are self-evident to those using the composition to make films. The tendency to exudation, or its absence, may require more than a casual examination of the product. Hence, an accelerated bleeding test has been devised to determine which compositions will bleed and which will not. The test is made with thin molded sheets, 0.025 inch thick, made from the composition. Several of these sheets are stacked above and several more are stacked below a thin white absorbent paper, such as a cigarette paper. The assembly is clamped together and exposed to a temperature of 70° C. to 48 hours. The paper is examined for evidence of oily spots.

The following table lists numerous compositions, both within and without the scope of the invention, together with observations as to extrudability, odor, and tendency to bleed. The copolymer employed in these tests was one of 85 percent vinylidene chloride and 15 percent vinyl chloride. The heat stabilizer of this invention is identified in the table simply as "glyceride."

Table

| Light Stabilizer | | Heat Stabilizer | | Plasticizer | | Extrudability | Bleeding, in 70° C. Test |
|---|---|---|---|---|---|---|---|
| Kind | Amount, Percent | Kind | Amount, Percent | Kind | Amount, Percent | | |
| Tertiary butyl salol. | 2.5 | Glyceride | 1.5 | Ethyl phthalyl ethyl glycolate. | 2 | Good | None. |
| Do | 2.5 | do | 1.5 | do | 3 | do | Do. |
| Do | 2.5 | do | 1.5 | do | 4 | do | Trace. |
| Do | 2.5 | do | 1.5 | do | 5 | do | Slight. |
| Do | 2.0 | do | 1.0 | do | 5 | do | None. |
| Do | 1.0 | do | 0.5 | do | 5.5 | do | Do. |
| Do | 1.0 | do | 0.5 | do | 6.0 | do | Slight. |
| Do | 2.5 | do | 1.5 | do | 1.5 | Poor | None. |
| Isopropylidene disalicylate. | 2.0 | do | 1.0 | do | 5.0 | Good | Do. |
| Do | 2.0 | do | 1.0 | Mono-octyl diphenyl phosphate. | 5.0 | do | Do. |
| Do | 2.0 | do | 1.0 | do | 5.5 | do | Slight. |
| Salol | 2.5 | 3(2-xenoxy)-1,2-epoxy propane. | 3 | Ethyl phthalyl ethyl glycolate. | 3 | do | Do. |
| Tertiary butyl salol. | 2.5 | do | 3 | do | 4 | do | Wet. |
| Do | 2.0 | do | 1.5 | do | 5 | do | Do. |
| Do | 3.0 | Glyceride | 2.5 | do | 1.5 | Very poor | None. |
| Do | 1.0 | do | 0.5 | do | 1.5 | Not extrudable. | Do. |

In a specific example, copolymers of 85 percent and of 73 percent vinylidene chloride and 15 percent and 27 percent vinyl chloride, respectively, were each compounded with 2.5 percent of their weight of tertiary-butyl salol, 3 percent of ethyl phthalyl ethyl glycolate, and 1.5 percent of the previously defined glyceride (molecular weight 1087, oxirane content 5.8 percent, average neutralization equivalent of acid, after hydrolysis, 339). Each composition was extruded readily through a tube-forming die, with no evidence of sticking or decomposition in the extruder. The extruded tubes were supercooled in water and were oriented to form tubular film by the now well known distended bubble procedure. The resulting films were crystal clear, odorless, and showed no tendency to exude even after prolonged storage in a warm place. They were satisfactory in every respect for food wrappers.

The invention has been illustrated with respect to the crystalline copolymers of vinylidene chloride and vinyl chloride. The same problems exist, and they are solved by the same combination of modifying agents, with any other crystalline copolymer of vinylidene chloride having a melting point in the range from 150° to about 180° C. For the present purposes, any such copolymer is the equivalent of those recited in the examples.

I claim:

1. An extrudable composition consisting essentially of a copolymer of from 95 to 70 percent vinylidene chloride and 5 to 30 percent vinyl chloride and from 3.5 to 8 percent in the aggregate, based on the weight of copolymer, of: (a) from 2 to 5.5 percent of a compatible, at least partially aromatic, ester plasticizer for the copolymer, selected from the group consisting of the alkyl phthalyl alkyl glycolates wherein each alkyl group contains from 1 to 4 carbon atoms, the mono-alkyl diaryl phosphates wherein the alkyl group contains from 4 to 12 carbon atoms, and the alkyl phthalates having from 4 to 8 carbon atoms in the alkyl groups, (b) from 1 to 2.5 percent of an ester of salicylic acid in which the non-salicylic esterifying radical is aromatic, and (c) from 0.5 to 1.5 percent of an epoxidized vegetable oil which is a neutral glyceride, free from hydroxyl groups, containing an average of 3 to 5 oxirane rings per molecule, having a molecular weight from about 900 to 1200, and yielding on alkaline hydrolysis hydroxy fatty acids having average neutralization equivalents in the range from about 300 to about 380.

2. The composition claimed in claim 1, wherein the plasticizer is an alkyl phthalyl alkyl glycolate.

3. The composition claimed in claim 1, wherein the salicylic acid ester is tertiary butyl phenyl salicylate.

4. An oriented, odorless and non-exuding film of the composition claimed in claim 1.

References Cited in the file of this patent

UNITED STATES PATENTS

| 2,464,172 | Britton et al. | Mar. 8, 1949 |
| 2,464,250 | Moll et al. | May 15, 1949 |
| 2,559,177 | Terry et al. | July 3, 1951 |
| 2,859,197 | Reid et al. | Nov. 4, 1958 |

OTHER REFERENCES

Greenspan et al.: Epoxy Fatty Acid Ester Plasticizers, pages 2722–6, Ind. and Eng. Chem., December 1953.